Dec. 1, 1964 G. H. FREMON 3,159,173
ASSEMBLY FOR INCREMENTAL ROTATION OF
A LINEAR MOTION VALVE PISTON
Filed June 2, 1961
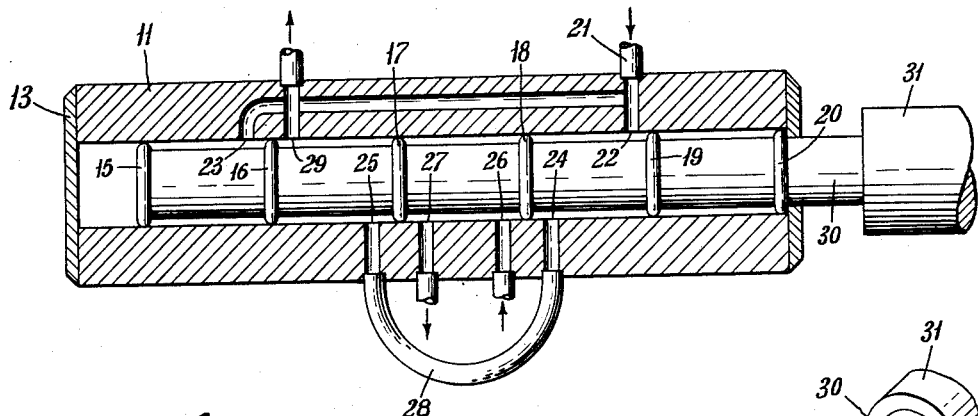
Fig. 1.
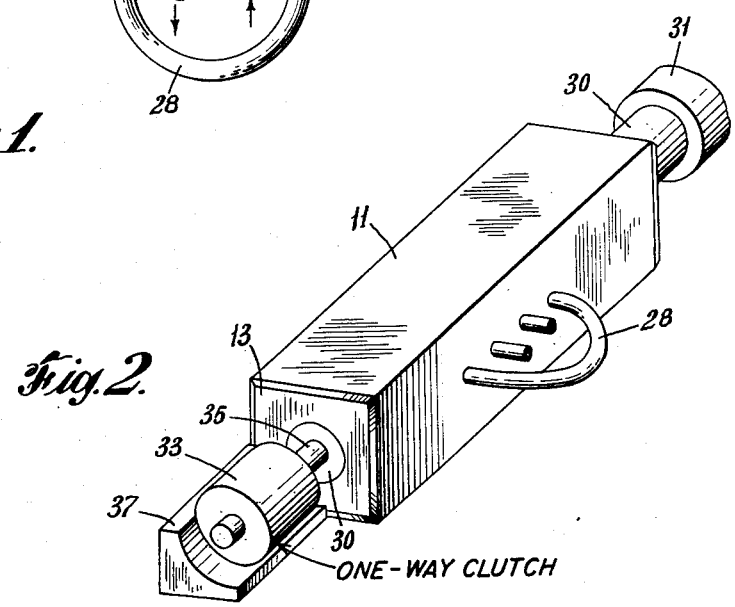
Fig. 2.
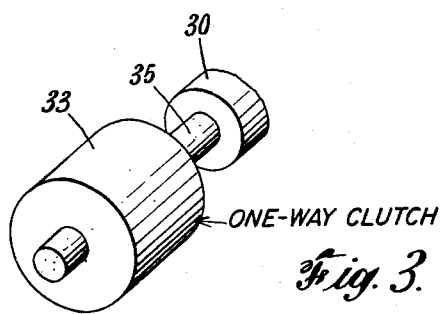
Fig. 3.
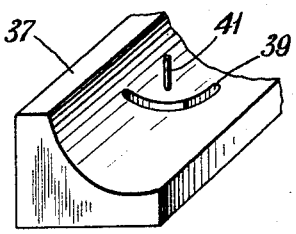
INVENTOR.
GEORGE H. FREMON
BY Howard K. Kotler
ATTORNEY United States Patent Office 3,159,173
Patented Dec. 1, 1964

3,159,173
ASSEMBLY FOR INCREMENTAL ROTATION OF A LINEAR MOTION VALVE PISTON
George H. Fremon, Princeton, N.J., assignor to Union Carbide Corporation, a corporation of New York
Filed June 2, 1961, Ser. No. 114,492
3 Claims. (Cl. 137—331)

This invention relates, in general, to a method and apparatus for reducing abrasive wear in reciprocating machines. More particularly, the invention relates to a method and apparatus for reducing O-ring wear in linear motion valves.

Essentially, linear valves consist of a housing having an internal cylindrical bore with one or more ports drilled through the housing and communicating with the bore cavity, and a piston, fitted with rings, moving reciprocatingly in an axial direction in said bore. Prior to the present invention, operation of linear valves has caused the wear on a section of the piston ring that repeatedly passes over a port to be greater than the wear on any other section. This uneven wear eventually results in faulty valve operation and leakage, particularly if the ports have sharp edges and the piston ring is of relatively soft material, as is normally the case. The problem becomes particularly acute when these valves are used as analytical sampling devices where leakage must be kept to an absolute minimum. Although several methods to mitigate this uneven wear problem have been proposed, none has been successful in reducing leakage to negligible proportions after extended use of the valve apparatus.

The present invention eliminates the concentrated abrasive wear on a particular section of the piston ring by providing means to rotate the piston through an angular displacement during each reciprocating cycle. Thus, a different area of the piston ring is exposed to the ports for each successive valve actuation. If the piston rings are rigidly mounted on the piston shaft, the increment of angular displacement is selected so that a section that has been exposed once will not engage the ports again until a large number of reciprocating cycles of valve actuation have been effected. Alternatively, if the piston rings are not rigidly mounted on the piston shaft, rotation of the piston will result in a variable angular displacement of the piston rings as some slippage of the rings relative to the valve body will take place. Applying the method of this invention results in very slow and uniform wear on the entire peripheral surface area of the piston ring and virtual elimination of the leakage problem. It should be noted that the term "piston ring" as used herein refers not only to conventional O-rings but includes any circular annular boss of a piston member, particularly as used to achieve sealing.

A fuller understanding of the method of this invention, as well as an illustration of an apparatus by means of which the method of this invention can be carried out, may be had by referring to the following description and claims, taken in conjunction with the accompanying drawings in which:

FIGURE 1 is a longitudinal cross-sectional view of a multi-port, linear motion valve in which the method of the present invention may be embodied;

FIGURE 2 is an isometric view of the valve of FIGURE 1 equipped with means to rotate the piston according to the method of the present invention; and, FIGURE 3 is an isometric view showing in greater detail the one-way clutch assembly used to achieve the desired rotation in the embodiment of the invention shown in FIGURE 2.

With reference to FIGURE 1, the invention is illustrated as being incorporated in a linear-motion, multi-port valve of a type commonly used in fluid stream analysis. As shown, the valve comprises a valve body 11 having an axially disposed internal cylindrical bore extending through the length of the valve body 11, a closed end 13 and an open end; a sample inlet opening 21 communicating with a conduit which splits into two branches terminating respectively at ports 22 and 23, a sample outlet port 29, a carrier gas inlet terminating at port 26, a carrier gas outlet port 27, a looped conduit 28 connecting ports 24 and 25; a shaft having a piston member portion 30 and a shank portion 31, and six identical piston rings 15, 16, 17, 18, 19 and 20 mounted on said piston member. The piston member 30 is provided with a series of reduced diameter sections, separated by the piston rings to provide a series of non-communicating annular chambers between the outer surfaces of the reduced diameter sections and the wall of the internal cylindrical bore. The function of the valve is to receive a continuous sample stream and to discontinuously eject fixed quantities of sample, contained in a carrier gas, which are then led to an analyzing apparatus. Briefly, the valve operates as follows: with the piston in the position shown in FIGURE 1, the sample, continuously introduced through opening 21, flows through port 22 into the annular chamber between rings 18 and 19. When this chamber has been filled, the sample flows through conduit loop 28 into the annular chamber between rings 16 and 17, filling this chamber also, and then out through sample outlet port 29. Simultaneously a dead space annular chamber between rings 15 and 16 is also filled with sample entering through port 23. During this purging and filling of the above-mentioned annular chamber with sample, carrier gas is admitted continuously through inlet port 26, filling the annular chamber between rings 17 and 18, and discharging through port 27. Now a suitable linear valve drive connected to the shank member 31 actuates the valve mechanism to move the piston member 30 to a new position, to the left, of the position shown, wherein the annular chamber between rings 18 and 19 now communicate with ports 24 and 26. Carrier gas, admitted through port 26, removes the sample contained in the annular chamber and carries it through conduit loop 28 into the annular chamber between rings 17 and 18, which now communicates with ports 25 and 27, and out through carrier outlet port 27 to the analyzing apparatus. The sample introduced through 23 while the piston is in the new position is vented by entering the annular chamber between rings 16 and 17 and leaving through port 29. Operation of the valve thus results in repeated exposure of O-rings 16, 17, 18 and 19 to sharp-edged ports at the rate of two exposures per valve cycle. It is inevitable that, after prolonged use of valves of this type, the abrasion caused on the O-rings, which are made of rubber or other flexible materials which by nature are relatively soft, by the sharp metal edges of the valve ports, will lead to leakage problems. Further, even if the port edges are rounded, the section of the O-ring that engages a port will repeatedly bulge into the port and be forced back by the bore wall and, thus, be subject to stresses and strains that may ultimately cause cracking of the ring. Although the abrasive wear may be mitigated by rounding and smoothing the port edges, uneven wear on a particular section of the O-rings will still take place.

In FIGURES 2 and 3, the above-described linear motion valve has been equipped with means to rotate the piston member 30. The apparatus used to effect the rotation as shown comprises a one-way clutch assembly having an inner member 35 and an outer, cylindrical member 33; a bracket 37 rigidly affixed to the end 13 of the valve body 11; a curved keyway 39 cut into the face of said bracket; and a pin 41 rigidly mounted on said outer member 33 of said clutch, said pin 41 extending from the surface of said outer member 33. The internal cylindrical bore is extended through the formerly closed end 13 and the piston member 30 is lengthened to protrude through the extended cylindrical bore. The piston member 30 is rigidly coupled to the inner member 35 of the one-way clutch assembly. The bracket 37 is machined so that a cylindrical surface coaxial with the outer member 33 of the clutch is formed around a section of said outer member. The pin-keyway arrangement of FIGURE 2 is shown in greater detail in FIGURE 3. Rotation of the piston member 30 is achieved as follows: as the shank member 31 and the piston member 30 move reciprocatingly upon valve actuation, pin 41 mounted on the outer member 33 of the clutch is guided by the keyway 39 in bracket 37 to impart a twisting moment to outer member 33 of the clutch, said twisting moment being transmitted to the piston member 30 via the inner member 35 of the clutch, thereby angularly displacing the O-rings 15, 16, 17, 18, 19 and 20 relative to valve body 11. The amount of this angular displacement is controlled by the magnitude of linear displacement of the piston and shank member travel along the axis of reciprocation and the curvature of the keyway 39. As the piston member 30 returns to its original position, pin 41 is guided back through keyway 39 and the rotation imparted to piston member 30 is in an opposite direction. Now, however, the outer member 33 of the clutch is free to turn about the inner member 35 so that the inner member 35, the piston member 30, and the O-rings 15–20 remain in the new position. Thus, the outer member 33 of the clutch is rotated in one direction as the valve opens and in the opposite direction as it closes. However, rotation of the inner member 35 occurs for only one direction of outer member 33 rotation. The rotation of piston member 30 and the O-rings mounted thereon is therefore in one direction and in equal increments.

If the piston rings are rigidly mounted on the piston, that is, if there is no rotation of the rings about the piston, it is evident that the particular magnitude of actuated angular displacement will be, to some extent, influenced by the particular structure of the apparatus to which the method of this invention is applied. The choice of a suitable angular displacement for a particular apparatus is within the scope of one skilled in the art. The amount of rotational displacement is limited by two practical considerations. An unnecessarily large displacement will require a sharply curved keyway, given a set distance of longitudinal shaft travel, and result in large stresses on the whole valve assembly, in addition to requiring a greater applied valve actuating force. An unnecessarily small displacement, on the other hand, would be undesirable as there is some play inherent in devices of this type and, if the amount of this play is not negligible compared to the actuated rotation, deviations from the predetermined displacement may result. Thus the precise magnitude of angular displacement chosen for any given application may vary quite widely and is readily determinable by one skilled in the art. Alternatively, as noted above, if some slippage of the piston rings on the piston member is allowed, the actuated increment of angular displacement is not important if the frequency of valve actuation is sufficient to result in substantially random rotation of the piston rings relative to the valve body.

It should be understood that the foregoing description covers only one of many possible embodiments of this invention. Means other than a one-way clutch may be employed to achieve the rotation. Although it is preferable to utilize the valve actuating force to achieve the rotation, this is not essential and an auxiliary actuating device may be employed. For example, in the linear motion valve shown in FIGURE 1, the portion of the piston member 30 between the valve actuating device and the valve body can be lengthened and machined to have an axially positioned slot, cut into its surface. A ring-shaped ratchet is then mounted on said piston member portion and is loosely keyed into the axial slot so that the piston member is free to move axially upon valve actuation while the ratchet remains stationary. The ratchet is actuated by a pawl driven by an external, auxiliary actuating device. Here the rotation of the piston member would be, of course, completely independent of its axial movement. If more convenient, the ratchet could be mounted on an extension of the piston member outside the valve body on the side opposite to the valve actuating device.

It should also be noted that, although the present invention has been illustrated as being incorporated in a linear motion valve, it may be embodied in any apparatus or machine which comprises a member reciprocating within a cylindrical bore where the reciprocating member is free to turn on its longitudinal axis. If the position of the reciprocating member is fixed rotationally, it might, of course, be modified with a swivel joint or the like to make application of the method of this invention possible.

What is claimed is:

1. In combination with a linear motion valve comprising a piston member, fitted with rings, reciprocating within a valve body for controlling flow through a fluid passage formed in said body having at least one port, apparatus to reduce ring wear which comprises, in combination, a coupling shaft affixed to and coaxial with said reciprocating piston member, a one-way clutch having an inner driven member attached to said coupling shaft and a cylindrical outer driving member rotating said inner member in one direction of rotary movement and having a non-drive relationship in the opposite direction, a pin mounted on said outer member, a bracket rigidly affixed to said valve body, said bracket having a cylindrical face and containing a curved keyway cut into said cylindrical face, said pin being guided by said curved keyway upon valve actuation and axial movement of said clutch to impart a rotary movement to said driving member upon axial movement of said clutch in one direction, said rotary movement being transmitted to the piston member via said coupling shaft, axial movement of said clutch in the opposite direction imparting no rotary movement to the driven member or piston member, whereby reciprocal valve actuation results in incremental rotation of said piston member.

2. In combination with a linear motion valve comprising a valve body and, reciprocating therein, a piston member having circumferentially enlarged portions for controlling flow through fluid passage formed in said body, apparatus to distribute wear evenly around the periphery of said enlarged portions, which apparatus comprises, in combination, one-way clutch means comprising an outer driving member and an inner driven member, said outer member rotating said inner member in one direction of rotary movement and having a non-drive relationship in the opposite direction, coupling means coaxially connecting said inner clutch member with said piston member, matching groove and protruding engagement means arranged to impart a rotary movement to said driving member upon axial movement of said clutch in one direction, said rotary movement being transmitted to the piston member via said coupling shaft, axial movement of said clutch in the opposite direction imparting no rotary movement to the driven member or piston member, whereby reciprocal valve actuation results in incremental rotation of said piston member.

3. In combination with a linear motion valve comprising a piston member, fitted with rings, reciprocating within a valve body for controlling flow through a fluid passage formed in said body having at least one port, apparatus to reduce ring wear which comprises, in combination, a coupling shaft affixed to and coaxial with said reciprocating piston member, a one-way clutch having an inner driven member attached to said coupling shaft and a cyclindrical driving outer member rotating said inner member in one direction of rotary movement and having a non-drive relationship in the opposite direction, protruding engagement means and matching groove means on said outer member and on bracket means rigidly affixed to said valve body, said protruding engagement means and matching groove means being so arranged as to impart a rotary movement to said driving member upon axial movement of said clutch in one direction, said rotary movement being transmitted to the piston member via said coupling shaft, axial movement of said clutch in the opposite direction imparting no rotary movement to the driven member or piston member, whereby reciprocal valve actuation results in incremental rotation of said piston member.

References Cited in the file of this patent

UNITED STATES PATENTS

| 1,183,852 | Buck | May 23, 1916 |
| 2,965,131 | Oros | Dec. 20, 1960 |

FOREIGN PATENTS

| 6,575 | Great Britain | of 1898 |